United States Patent
Facius et al.

(10) Patent No.: US 8,144,188 B2
(45) Date of Patent: Mar. 27, 2012

(54) PROJECTOR ARRANGEMENT

(75) Inventors: Zoltan Facius, Waiblingen (DE);
Markus Kamm, Karlsruhe (DE);
Evangelos Zoidis, Waiblingen (DE)

(73) Assignee: Sony Deutschland GmbH, Cologne (DE)

( * ) Notice: Subject to any disclaimer, the term of this patent is extended or adjusted under 35 U.S.C. 154(b) by 1183 days.

(21) Appl. No.: 11/578,154

(22) PCT Filed: Apr. 18, 2005

(86) PCT No.: PCT/EP2005/004115
§ 371 (c)(1),
(2), (4) Date: Oct. 16, 2007

(87) PCT Pub. No.: WO2005/101821
PCT Pub. Date: Oct. 27, 2005

(65) Prior Publication Data
US 2008/0192152 A1    Aug. 14, 2008

(30) Foreign Application Priority Data
Apr. 19, 2004 (EP) .................................... 04009209

(51) Int. Cl.
*H04N 13/00* (2006.01)
(52) U.S. Cl. ................ 348/42; 348/51; 348/52
(58) Field of Classification Search .............. 348/42, 348/51, 52
See application file for complete search history.

(56) References Cited

U.S. PATENT DOCUMENTS

| | | | |
|---|---|---|---|
| 5,121,983 A | 6/1992 | Lee | |
| 5,905,545 A | 5/1999 | Poradish et al. | |
| 6,406,148 B1 | 6/2002 | Marshall et al. | |
| 7,688,347 B2* | 3/2010 | Dolgoff | 348/44 |
| 2003/0123148 A1 | 7/2003 | Sedlmayr | |
| 2003/0206179 A1* | 11/2003 | Deering | 345/589 |
| 2003/0231261 A1* | 12/2003 | Bassi et al. | 348/745 |
| 2010/0289969 A1* | 11/2010 | Yamazaki et al. | 348/744 |

FOREIGN PATENT DOCUMENTS

| | | |
|---|---|---|
| CN | 1344116 A | 4/2002 |
| DE | 40 40 081 | 7/1991 |
| DE | 199 10 157 A1 | 9/1999 |
| EP | 1 137 293 A2 | 9/2001 |

(Continued)

OTHER PUBLICATIONS

U.S. Appl. No. 11/166,513, filed Jun. 24, 2005, Kamm, et al.
International Search Report mailed on Sep. 16. 2005 issued in International application No. PCT/EP2005/004115 which was filed on Apr. 18, 2005.
Written Opinion of the International Searching Authority mailed on Sep. 16, 2005, issued in International application No. PCT/EP2005/004115 which was filed on Apr. 18, 2005.

*Primary Examiner* — Phuoc Nguyen
(74) *Attorney, Agent, or Firm* — Oblon, Spivak, McClelland, Maier & Neustadt, L.L.P.

(57) ABSTRACT

A projector arrangement includes a first image generation and projection unit and a second image generation and projection unit. A first or two-dimensional projection/display mode and a second stereoscopic or projection/display mode can be realized by the cooperating first and second image generation and projection units. The second image generation and projection unit is configured to receive waste light from the first image generation and projection unit and to base the generation of its respective second image on the waste light.

18 Claims, 9 Drawing Sheets

FOREIGN PATENT DOCUMENTS

| | | |
|---|---|---|
| EP | 1 221 817 A1 | 7/2002 |
| GB | 10 603 | 4/1898 |
| GB | 231 563 | 4/1925 |
| GB | 704 918 | 3/1954 |
| JP | 08-331602 | 12/1996 |
| WO | WO 99/44091 A1 | 9/1999 |
| WO | WO 01/57592 A2 | 8/2001 |
| WO | WO 02/39173 A1 | 5/2002 |

\* cited by examiner

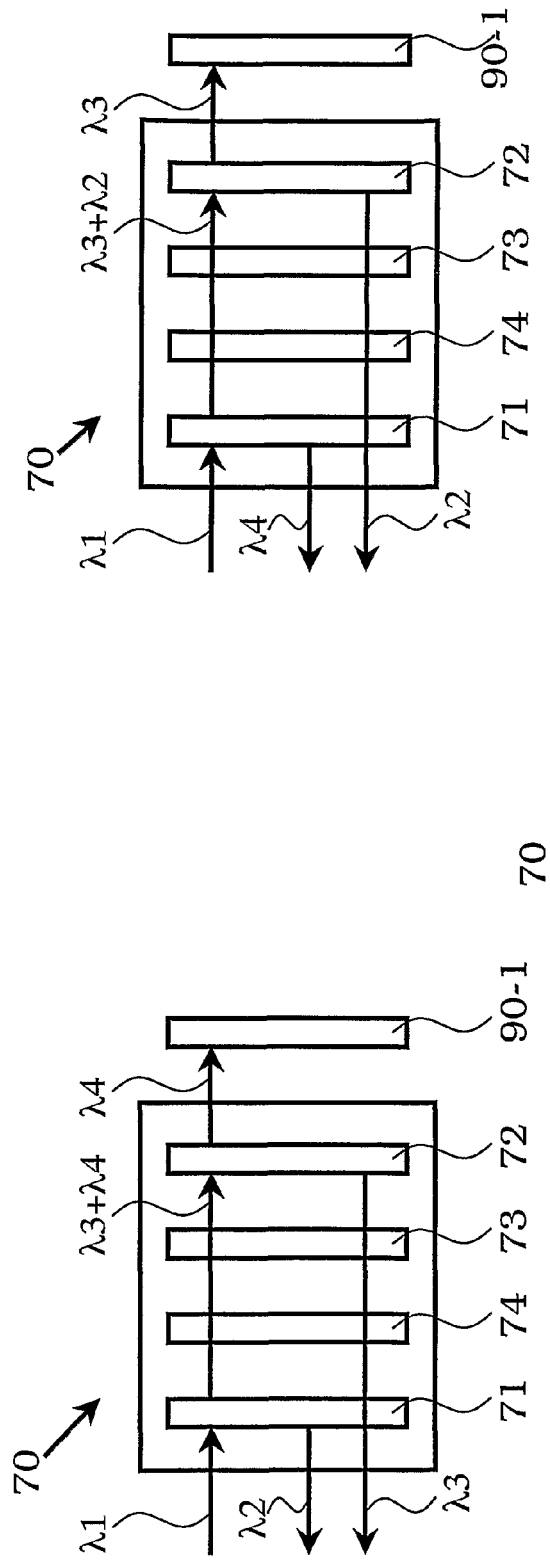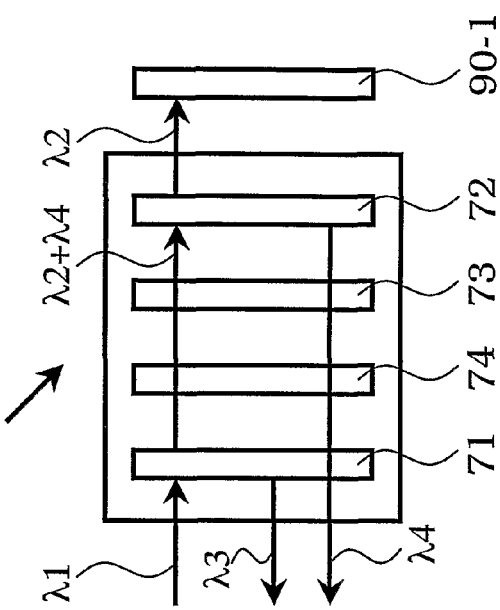
Fig. 8A
Fig. 8B
Fig. 8C

PROJECTOR ARRANGEMENT

The present invention relates to a projector arrangement.

Nowadays, image displaying and image projection techniques become more and more popular and important, in particular in electronic appliances and in equipment for information exchange and display.

An aspect which becomes more and more important is to realize stereoscopic or three-dimensional projection capabilities. However, known apparatuses for realizing such stereoscopic or three-dimensional displaying or projection capabilities suffer from the number of different optical components which are necessary for the respective realizations.

It is therefore an object of the present invention to provide an projector arrangement which is capable of realizing two-dimensional as well as stereoscopic or three-dimensional projection functions and which is at the same time easy and flexible in its handing at a reduced space consumption.

The object is achieved according to the present invention by a projector arrangement with the characterizing features of claim 1. Alternatively, the object is achieved according to the present invention by a projector arrangement with the characterizing features of independent claim 3. Preferred embodiments of the inventive projector arrangements are within the scope of the dependent subclaims.

The projector arrangement according to the present invention comprises a first image generation and projection unit which is capable of generating a first image and of projecting or displaying said first image in a two-dimensional manner for a display image. Additionally, a second image generation and projection unit is provided which is capable of generating a second image and of projecting or displaying said second image in a two-dimensional manner for said display image. According to the present invention said first and second image generation and projection units are adapted and/or are arranged to realize in cooperation a first or two-dimensional projection/display mode in which said display image is projected and/or displayed in a strict two-dimensional manner. Further, said first and second image generation and projection units are adapted and/or are arranged to realize in cooperation a second, stereoscopic or three-dimensional projection/display mode in which said display image is projected and/or displayed in a stereoscopic or three-dimensional manner.

According to a first solution of the object of the present invention said first and second image generation and projection units are formed as modules which are detachably attachable with respect to each other. Said first image generation and projection unit is adapted to be operated or to be operable as a stand-alone device independent from the second image generation and projection unit in said first or two-dimensional projection/display mode.

It is therefore a basic idea behind the first solution of the object to arrange and/or to adapt said first and second image generation and projection units in a way that they can be combined or attached, in particular in said second, stereoscopic or three-dimensional projection/display mode. Further, said first and second image generation and projection units can be removed or separated from each other, in particular in said first or two-dimensional projection/display mode.

According to an alternative solution for the object of the present invention said second image generation and projection unit is adapted and/or arranged to receive waste light from said first image generation and projection unit and to base the generation of the respective second image on said waste light or a part or derivative thereof.

It is therefore a key idea of the second solution of the object of the present invention to avoid the necessity of a distinct illumination unit or lamp reserved for the second image generation and projection unit by arranging and/or adapting said second image generation and projection unit in a way that it may receive unused light, i. e. waste light from said first image generation and projection unit which is not used by said first image generation and projection unit in its generation process for the respective first image. Therefore, according to the second solution the number of components or parts of the projector arrangement can be produced.

Both alternatives can be combined with each other so as to arrive at a projector arrangement having two image generation and projection units which can be separated or attached to each other and which needs only one light generation part as the second image generation and projection unit uses waste light not used by the first image generation and projection unit for its image generation process.

According to a preferred embodiment of the present invention, said first image generation and projection unit is adapted and/or arranged to receive and/or to generate primary illumination light.

According to a first alternative of this measure, an external light generation device or lamp device can be used for the image generation and projection process of the inventive projector arrangement. As an alternative or in addition, the first image generation and projection unit may be adapted and/or arranged to generate primary illumination light on its own.

According to the latter alternative, said first image generation and projection unit may comprise an illumination unit and in particular a lamp device, or the like.

It is further preferred to adapt and/or to arrange said first image generation and projection unit in a way that only a part of the primary illumination light or a component thereof is used for generating said first image.

Consequently, said first image generation and projection unit may be preferably adapted and/or arranged to supply a part or component of said primary illumination light which is not used for generating said first image as waste light, in particular for the second image or projection unit.

According to a further advantageous embodiment of the present invention said first image and projection unit and/or said second image generation and projection unit may comprise an image generation unit, in particular a respective LCD-panel, for generating the respective first and second images, a beam splitting unit, in particular a respective polarization selective beam splitting cube or device, and/or a projection unit for projecting said first image and said second image, respectively.

According to a further alternative of the present invention, said first image generation and projection unit preferably comprises a color switching unit for time sequential color selection, in particular a reflective electronic color switch RECS.

Said color-switching unit may be arranged and/or adapted in order to receive light, to reflect a first part of said received light said first part being within a first spectral range and to transmit a second part of said received light said second part being within a second spectral range.

It is further preferred that said color-switching unit is arranged and/or adapted in order to be placed in a symmetrical manner in an illumination path and/or in order to work in a reflective mode for said first image generation and projection unit and to work in a transmitive mode for said second image generation and projection unit.

Additionally or alternatively, said first image generation and projection unit may comprise an interface section by means of which said waste light can be supplied to said second image generation and projection unit.

In the two latter discussed cases it is preferred that said interface section is based at least in part on said color selection unit.

These and further aspects of the present invention are explained in other words by taking reference to the following remarks:

The present invention relates in particular to a modular architecture for stereoscopic projection unit. It is an aim of invention is to provide a modular stereoscopic projection unit to produce a stereoscopic or 3D image. A rear projected image can be produced in perspective view by using eyeglasses with complementary polarization of each eye.

The modular principle provides two units, wherein one unit is a projecting module consisting of a Lamp, illumination part a beam splitting components with imager and a projection part. This unit is comparable to a projector with single imager device.

The second part consists a beam splitting part with a second imager and a projection part.

Where first part can be used as standard stand-alone 2D Projection unit for front and rear projection. The stereoscopic or 3D unit can only used rear projection mode with translucent rear-projection screen, which keeps the polarization.

2D and stereoscopic or 3D images can be generated depending on application. The device is compact 2D projection unit, which has an easy stackable stereoscopic or 3D module for stereoscopic projection. This flexibly allows multiple purposes.

The simplest way to produce a stereoscopic image is the use of two projectors stack together or place beside each other. Both projectors are placed behind a translucent screen (rear-projection) in that way, that their pictures are correlating (overlapping exactly).

Each picture is projected in a different polarization state.

Example: The picture for right eye is projected in p-polarized light the picture for the left eye is projected in s-polarized light. The observer has to wear glasses with a p-polarizer in front of the right eye and s-polarizer in front of the left eye to avoid that the light from left eye picture reaches the right eye and respectively. Only in this configuration the observer can receive a stereoscopic picture.

Currently two projectors have to be used. Both projectors emit linear polarized light, which has to be perpendicular to each other. This is achieved by putting a retarder after the projection lens of one of the projectors to turn the polarization state.

In the following some disadvantages of prior art stereoscopic or 3D projectors are given:
  two projector devices are needed, i.e. two power supplies, two lamps, two illumination systems,
  in addition external signal processing is needed for synchronization of both projectors,
  an additional external retarder is needed to turn the polarization stage respectively to the polarization stage of the other projector, and
  space requirement is comparable large.

The general concept is the modularity of this projection device and the freedom of application. An inventive device can be used either in a 2D or in a stereoscopic or 3D projection mode. Further, it can be decided to use the 2D projection mode in front or rear projection application.

The basis module may be a single panel projector using a reflective color manipulating part, e.g. a reflective electronic color switch or RECS. With this base module standard 2D images can be projected. It consists mainly of a lamp, illumination optics, a beam splitting component, a RECS, a micro display and a projection lens. Further the driving electronic is included.

The optional pluggable stereoscopic or 3D module consists of one beam splitting component, one micro display and one projection lens. Additionally the driving chip for the display is also implemented.

Both parts are designed in a way that after connecting both displays will be illuminated by the illumination system of the basis part. The optical interface is behind the RECS.

In standard single panel systems, the portion of unused light which is for instance about almost ⅔ of the total amount of light is reflected or absorbed by wavelength selective components and therefore no longer usable for illumination of the display. According to the present invention the second panel uses this unused light from the first panel.

Both displays are arranged equidistant from RECS and the rest of the illumination system. That's why no additional illuminations system or adaptive optic is necessary. In this configuration both projection lenses can be placed in very short distance to each other, which allows a compact architecture and even a short projection distance to screen, regarding the correlation of the images on the screen.

The working principle of a RECS is described shortly next:

For explanation of the working principle of the stereoscopic projector one color state of the RECS is chosen. In this state the RECS will e.g. reflect green as lambda 2 and transmit magenta as lambda 3.

The white light as lambda 1 leaving the illumination system has the p-polarization state.

The light runs through PBS and reaches the RECS. At the RECS the light will be separated in two parts, lambda 2 and 3. Where lambda 2 is reflected by the RECS additionally the polarization stage of lambda 2 has changed from p to s. The light with lambda 2 with 90° turned polarization stage will be reflected by PBS1 onto the display. Here, depending on the display mode, the polarization stage of the light lambda 2 will be changed or not. If the display turns the polarization stage the light lambda 2 can leave the system towards the projection lens. Otherwise the light lambda 2 keeps the polarization and it is reflected back to RECS and than back to the illumination system.

The light with the complementary color lambda 3 will be transmitted by the RECS without changing its polarization direction. Further it will be transmitted by the PBS2 and will reach the display 2. If the polarization of incoming light (lambda 3) is turned by the display, the reflected light will be guided to the projection lens. By keeping the polarization stage the light lambda 3 is reflected back to the illumination system by the display.

In this principle the complementary transmitted light can be used to illuminate a second panel to generate the same image information, 2D with enhanced system efficiency or second image information, which is necessary for stereoscopic image.

In one cycle or frame all primary colors red, green and blue will be imaged once on display 1, respectively all complementary colors will be imaged onto display 2.

This regard the display color-driving scheme has to be adapted for both displays. As usually in time sequential color generating processes, the duration of one frame lies below the physiological time resolution of our eyes or receptors thereof. The colored image information will be an integration of all three single color pictures of one frame.

Now, a short description with respect to the stereoscopic or 3D principle of projection is given:

The principle is the same as described above in state of the art. Two different images of two perspectives, one for the right eye and one for the left eye, are generated by the two displays. Each display generates one image. In the example above, the left eye will receive the image info generated by the left display and the right eye from the right display. It could be also vice versa.

Both images are different from the perspective as mentioned and also from the polarization state. We consider that the left display projects the image with s-polarized light and right display with p-polarized. Considering in addition that the light projected onto the rear-projection screen keeps the polarization, we can observe a three-dimensional or stereoscopic image by wearing glasses with absorptive polarizers. Where the polarizers are aligned to transmit only s-polarization for the left eye placed in front of the left eye and respectively p-polarization only for the right eye.

The optical interface or interface section may be kind of window which is covered by a shutter if the stereoscopic or 3D module is not plugged. Further electronic connectors for the supply of display and servo for focus are applied.

The electronic connecting scheme may be as follows: Everything is implemented in the basic module. Only the display driver for the stereoscopic or 3D module is not placed in the basic module (technical reasons). The driving control electronic handles the image information synchronized to the stage of the RECS (Color switch) in dependence of image content for the right eye and respectively for the left eye picture. Where display R will be driven with the image content for the right eye and display L will be driven with image content of left eye.

For the 2D projection mode the stereoscopic or 3D module has not be removed. The driving control will recognize the mode by the applied signal and will dive the displays with the same image information.

Possible advantages of the inventive concept may be:
1. a modular projector for 2D, stereoscopic or 3D or enhanced 2D,
2. possible application in 2D mode optional in front and rear projection,
3. no necessity of additional signal processing or synchronization electronic for stereoscopic or 3D projection mode, and/or
4. a most compact architecture for stereoscopic image projection with only one power supply, one lamp, and one illumination system.

These and further aspects of the present invention are further elucidated be the following description taking reference to the accompanying figures.

FIG. 1A-C are schematical diagrams elucidating the basic principles behind the inventive projector arrangement.

FIG. 8A-C are schematic views of the working principle of a dichroic based color switch.

In the following and in the figures similar or equivalent structures or elements having similar or equivalent functionalities are denotes by identical reference symbols. A detailed description is not repeated in each case of their occurrence.

Figure 1A:
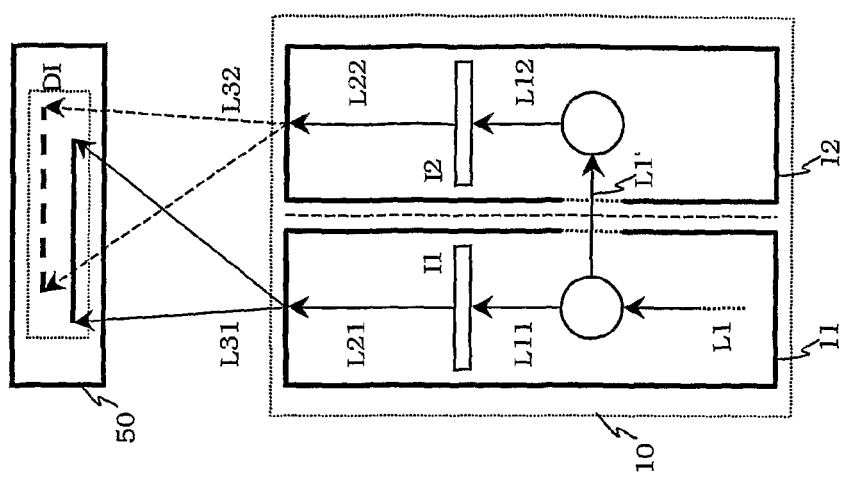
Figure 1B:
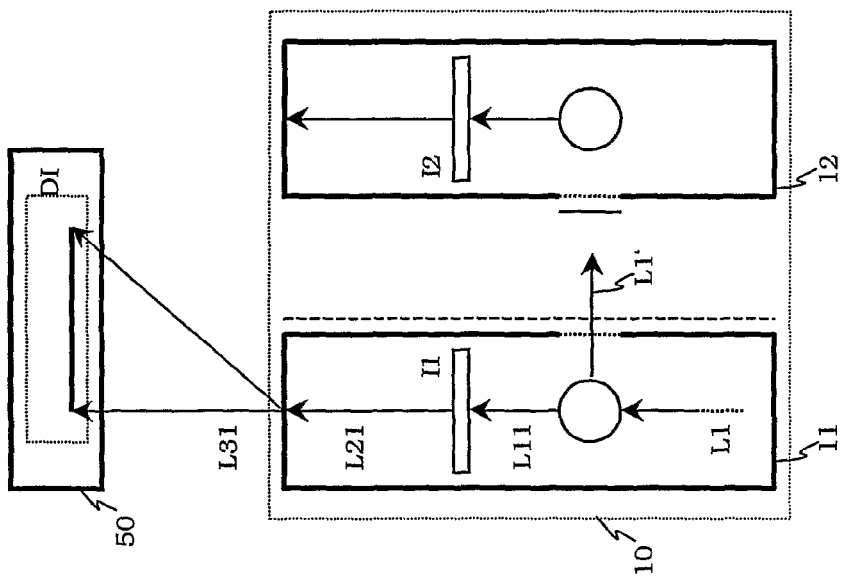
Figure 1C:
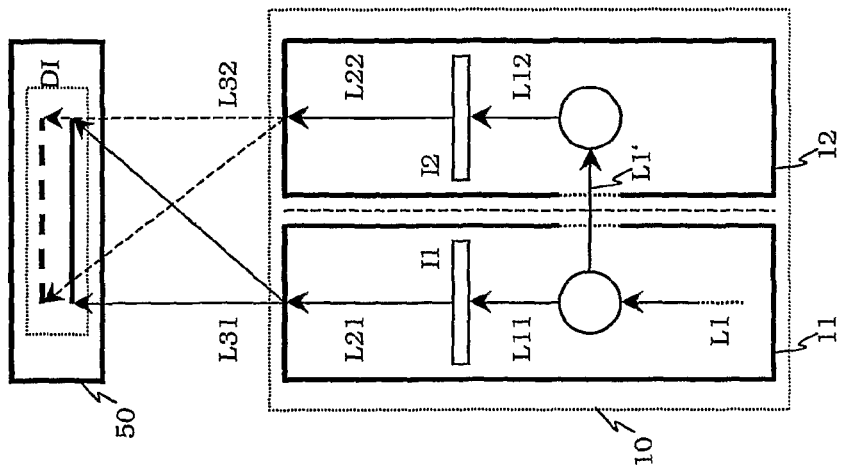

FIGS. 1A to 1C show by means of schematical diagrams basic aspects of embodiments of the inventive projector arrangement 10 in situations, where the display image DI has to be displayed and projected onto a display device 50, for instance onto a screen 50 or the like.

The inventive projector arrangement 10 of FIG. 1A comprises a first image generation and projection unit 11 and a second image generation and projection unit 12. In the projector arrangement 10 of FIG. 1A both first and second image generation and projection units 11 and 12 respectively are arranged in close spatial relationship to each other, for instance they are attached to each other.

The first image generation and projection unit 11 receives or generates primary illumination light L1. By certain optical processes at least a part or component L11 of said primary illumination light L1 is separated and/or used for the generation of a first image I1 for said first image generation and projection unit 11. Thereby, secondary illumination light L21 or image light L21 is generated and within a projection process emitted and/or projected as tertiary illumination light L31 or as projection light L31 towards a display unit 50, for instance a screen.

Components of said primary illumination light L1 which are not used for the process of generation said first image I1 are sent as waste light L1' to an interface section 80 positioned in an area or neighborhood between said first and said second image generation and projection units 11 and 12, respectively. This interface section 80 may be distributed over both of said first and second image generation and projection units 11 and 12, or may be entirely a part either of said first image generation and projection unit or of said second image generation and projection unit 12.

Upon receipt of said waste light L1' or a part thereof by said second image generation and projection unit 12 said waste light L1' or a part thereof L12 is used for a process of generating said second image I2 for said second image generation and projection unit 12. Thereby, second secondary illumination light L22 or second image light L22 for said second image generation and projection unit 12 is generated which is emitted and projected as second tertiary illumination light L32 or image light L32 onto the same display unit 50.

Consequently, the display image DI to be displayed is produced as an superposition of said first image I1 and said second image I2 according to the situation shown in FIG. 1A.

In more detail, in the situation of FIG. 1A the respective imager panels of said first and said second image generation and projection units 11, 12 to produce the respective first and second images I1, I2 are controlled in a way that the images I1 and I2 are identical. Therefore, according to the situation of FIG. 1A a strict two-dimensional projection is realized utilizing both of said first and said second image generation and projection units 11, 12.

In the situation shown in FIG. 1B the second image generation and projection unit 12 is spatially separated or detached from said first image generation and projection unit 11. Therefore, the waste light L1' does not reach said second image generation and projection unit 12. Consequently, no second image I2 is generated and displayed. Accordingly, in FIG. 1B the strict two-dimensional projection scheme is realized using said first image generation and projection unit 11, only.

Finally, in FIG. 1C a situation comparable to the situation of FIG. 1A is shown. Instead of identical images I1 and I2 as in FIG. 1A the images I1 and I2 in FIG. 1C are different with respect to the perspective or their viewing angle and with respect to the polarization states regarding their respective tertiary illumination light L31, L32 or their projecting light L31, L32, respectively. Therefore, FIG. 1C demonstrates a situation where a stereoscopic or three-dimensional projection is realized on the display unit 50.

The sequence of FIG. 1A to 1C therefore demonstrates that the inventive projector arrangement 10 having two detachably attachable first and second image generation and projection units 11 and 12 yields a comparable high flexibility for the different projection schemes with a reduced amount of optical components.

Figure 2:
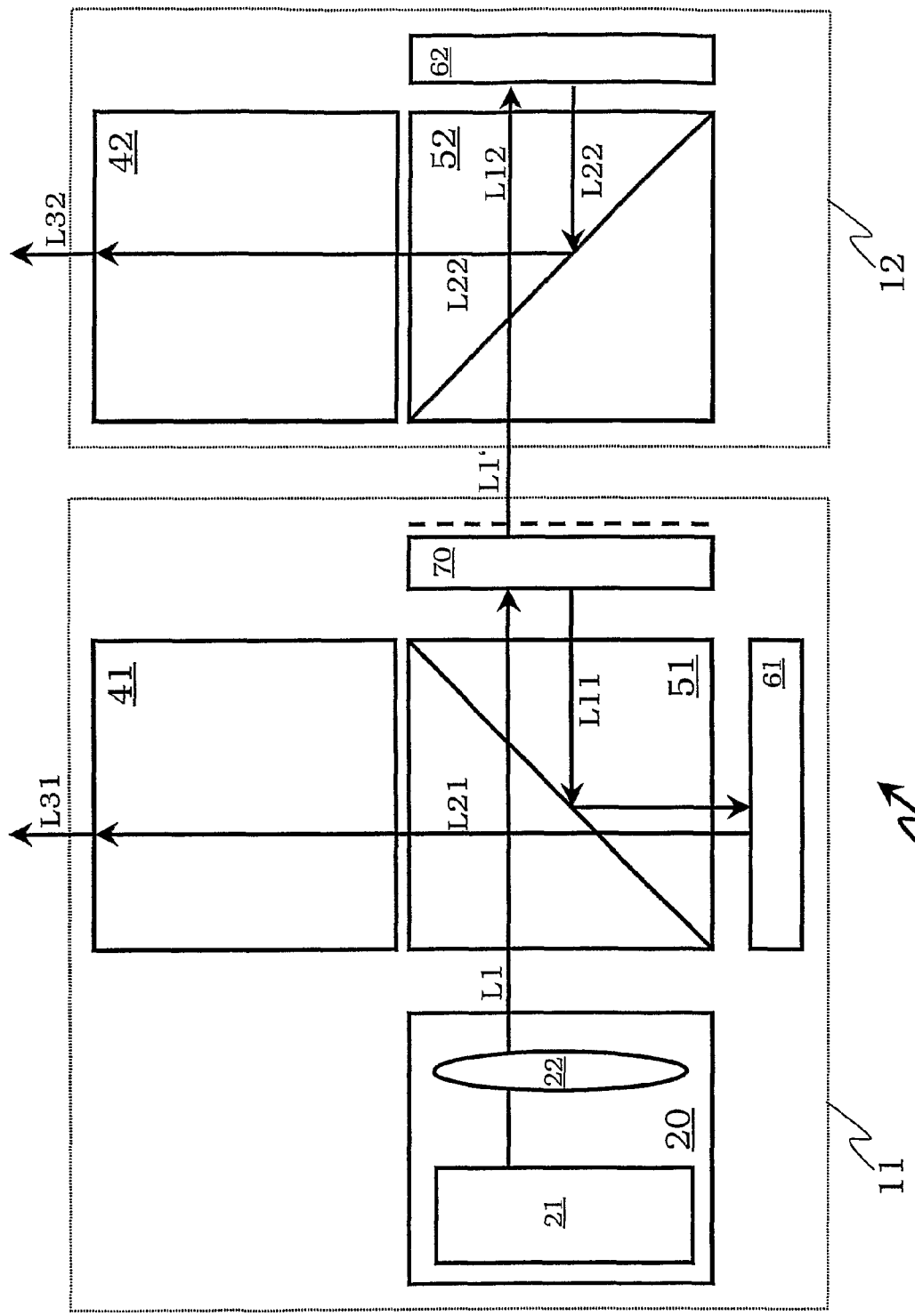
FIG. 2 shows by means of a schematical diagram in top view details of a further embodiment of the inventive projector arrangement.

FIG. 2 is a further schematical diagram demonstrating details for the situations shown in FIGS. 1A and 1C. Each of said first and second image generation and projection units 11 and 12 comprises a beam splitting section 51 and 52, a display section 61, 62 and a projection unit 41 and 42, respectively. In both cases, the beam splitting units 51 and 52 are formed as polarization selective beam splitting devices or cubes 51, 52. The image generation units 61 and 62 are formed as reflective LCD-panels 61, 62 in the situation shown in FIG. 2. The interface section 80 for the optical communication from said first image generation and projection unit 11 to said second image generation and projection unit 12 for supplying said waste light L1' is arranged together with a color switching unit 70, for instance a reflective electronic color switch 70.

Additionally, according to FIG. 2 said first image generation and projection unit 11 comprises an illumination unit with a lamp device 21 and respective illumination optics 22.

Figure 3:
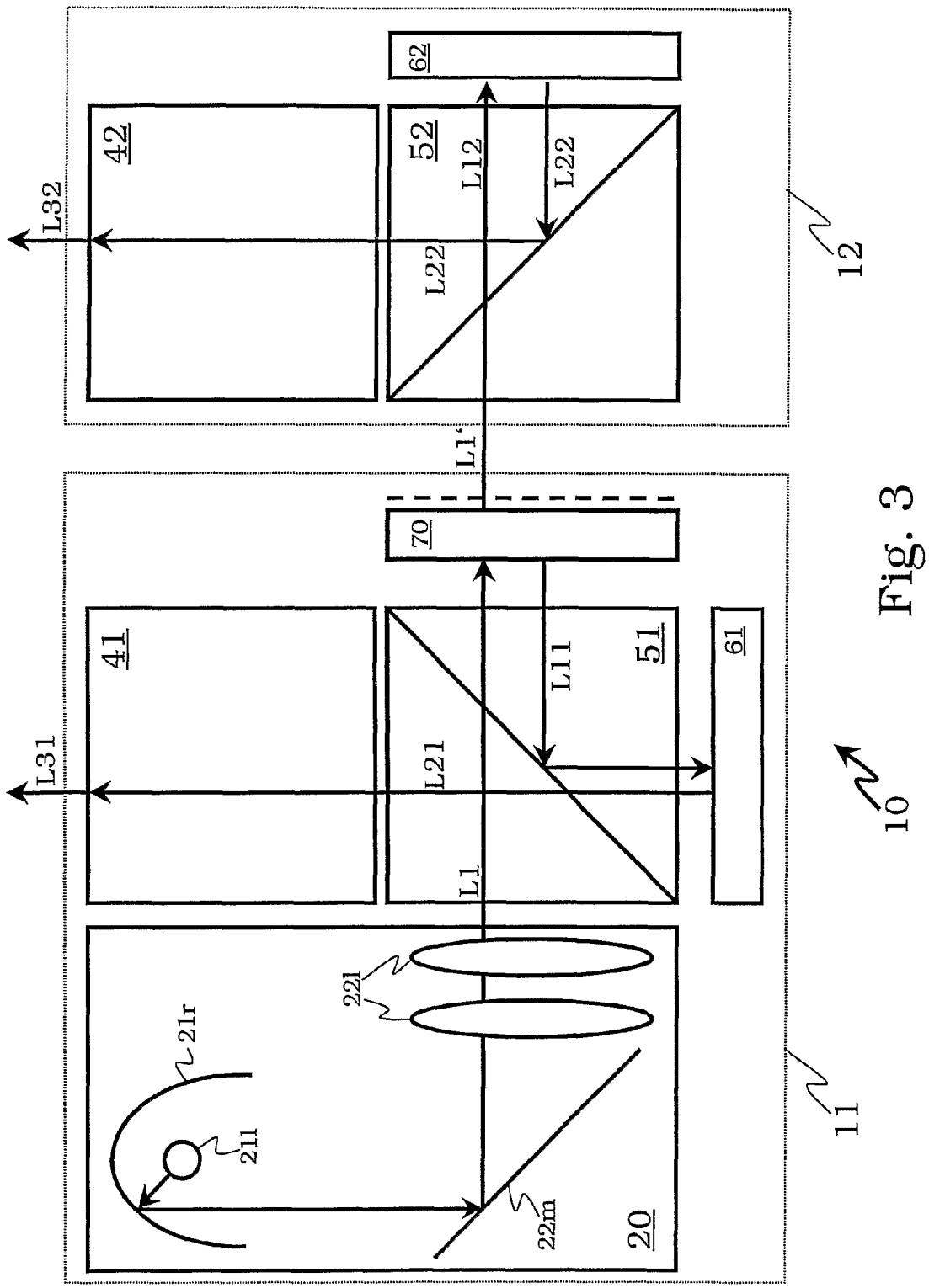
FIG. 3 shows by means of a schematical block diagram in top view details of a further embodiment of the inventive projector arrangement.

The situation shown in FIG. 3 is comparable to the situation shown in FIG. 2 but contains more details with respect to the illumination unit 20 and its parts or components. The lamp device 21 is formed by a lamp 21*l* together with a parabolic reflector 21*r*. The illumination optics 22 contains a deviation mirror 22*m* and a series of lenses 22*l*.

Figure 4:
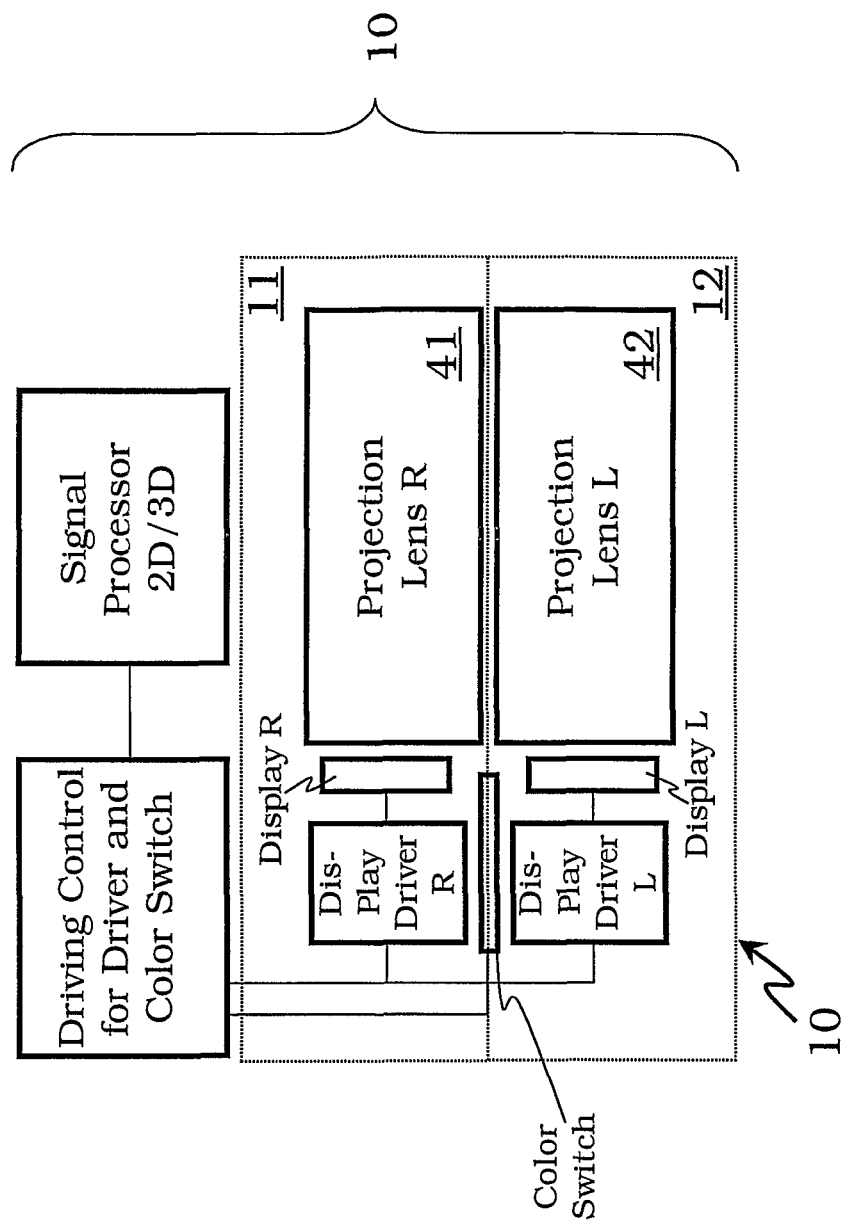
FIG. 4 is a schematical block diagram demonstrating the control structures for an embodiment of the preferred projector arrangement.

FIG. 4 demonstrates the controlling situation of the inventive projector arrangement. Here, the first and second image generation and projection units 11 and 12 are controlled by a respective signal processor for two-dimensional or for stereoscopic or three-dimensional projections the control data of which are supplied to a driving control for controlling the imaging units 61 and 62 and the color selection unit 70.

Figure 5:
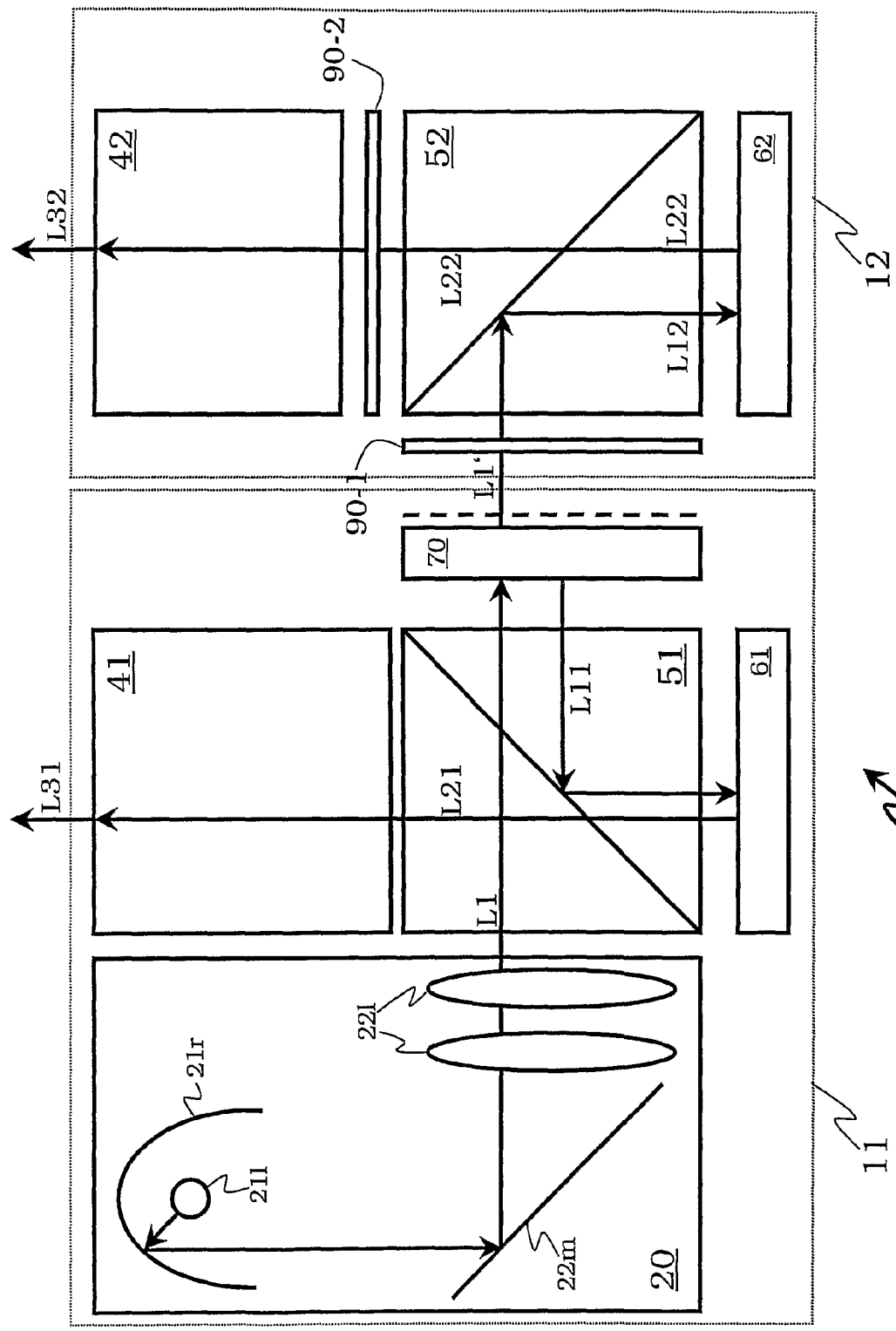
FIG. 5 shows by means of a schematical block diagram in top view details of a further embodiment of the inventive projector arrangement.

FIG. 5 is with respect is with respect to said first image generation and projection unit 11 comparable to the situation shown in FIG. 3. In contrast to the situation shown in FIG. 3 the imaging unit 62 of said second image generation and projection unit 12 is arranged in a comparable manner when compared with said first image generation and projection unit 11. Therefore, additional half wave retarders 90-1 and 90-2 are included to change the polarization states of the entering waste lights L1' and of the secondary illumination lights leaving the beam splitting unit 52 and entering the projection unit 42 of said second image generation and projection unit 12.

Figure 6A:
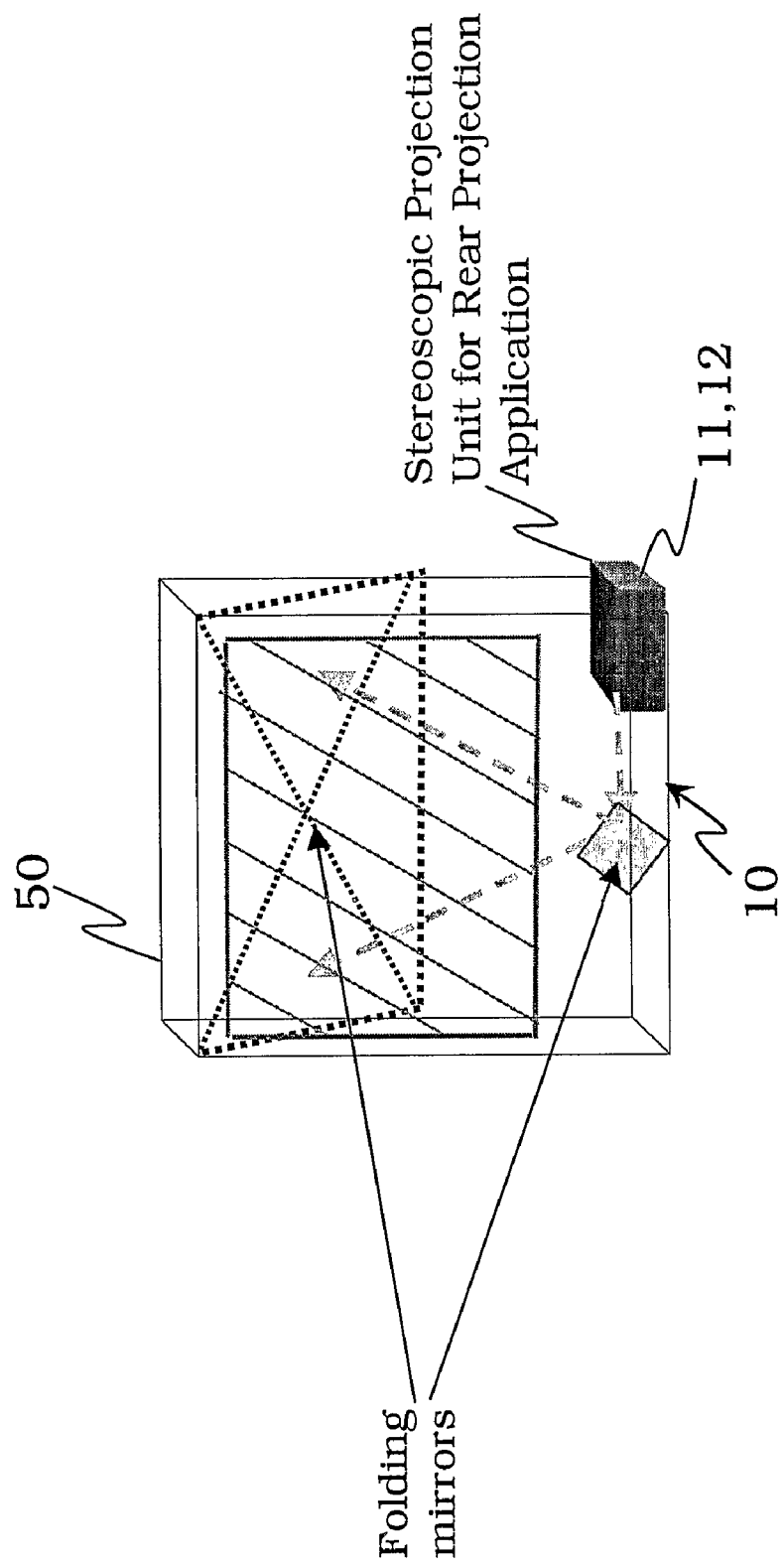
FIG. 6A, 6B are prospective views demonstrating some details for stereoscopic or three-dimensional projection schemes.

FIG. 6A demonstrates by means of a schematical and perspective diagram an application in which the inventive projector arrangement can realize a stereoscopic or three-dimensional rear projection. The stereoscopic or 3D-projector, i.e. the second image generation and projection unit 12, is plugged in the side of rear projection box and projects its image onto the rear projection screen. The stereoscopic or 3D image can be observed with polarizer glasses. In 2D mode the picture can be observed without polarization glasses.

FIG. 6A shows a rear projection box in which the projection module or unit 10 can be positioned to produce stereoscopic pictures or images. It is possible to have a slot in the rear projection box where the unit or module 10 can be plugged in. The light leaving the projection unit 10 is guided over folding mirrors onto a rear projection screen.

Figure 6B:
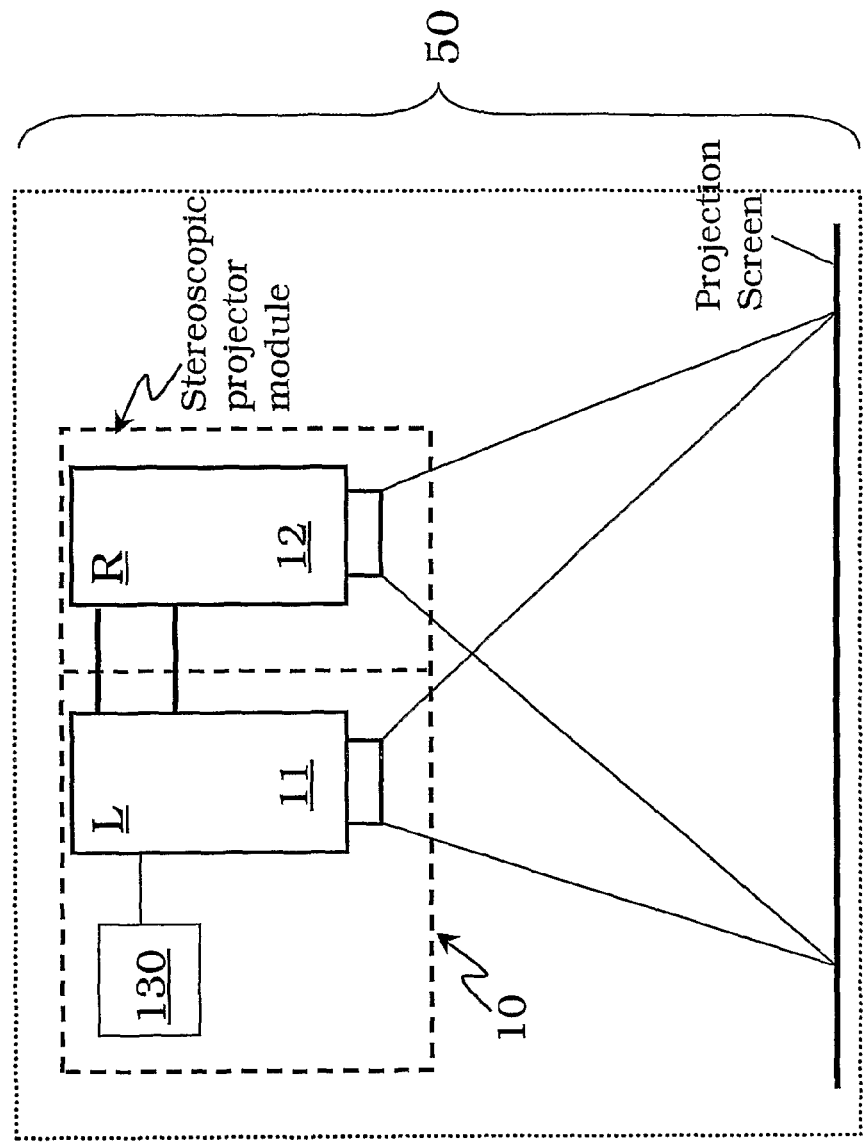

FIG. 6B shows a principle sketch of a rear projection arrangement without folding mirrors. The principle is similar to that of the two stacked projection units.

Figure 7:
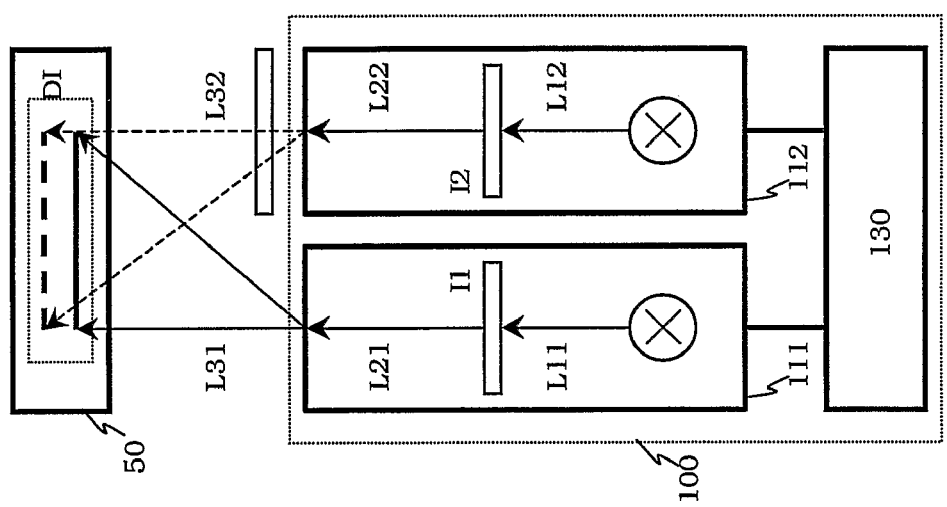
FIG. 7 is a schematical block diagram demonstrating aspects of a conventional projector arrangement.

FIG. 7 demonstrates the conventional situation when realizing a stereoscopic or three-dimensional projection. It is evident from the situation of FIG. 7 that each of said first and second image generation and projection units 111, 112 of the prior art are controlled by a common control unit 130 that individually possess illumination units 121 and 122, respectively.

The notions "stereoscopic" and "three-dimensional" or "3D" are used as synonyms in the description and the claims for the present invention. What is meant by this is to generate a picture by means of a stereoscopic projection to achieve a three-dimensional or 3D impression. Therefore, two pictures—which are each two-dimensional—with different perspectives are generated. These pictures or perspectives are designed to be essentially selectively received by the right eye and by the left eye of a viewer, respectively. The brain of the viewer then forms from the two different pictures the perspective or three-dimensional impression. According to the present invention these two pictures and perspectives are generated and projected. The user or viewer has to wear glasses or goggles to enable a selective perceptions of the two pictures.

In a simple configuration the color switch 70 consist of two color wheels 71, 72, a quarter wave plate 73 and absorptive polarizer 74. Both color wheels 71, 72 have three segments of reflective dichroic mirrors for red, green and blue.

The color wheels 71, 72 are placed in the illumination system between the PBS cubes 52 and 51. Both wheels 71, 72 are in series. The quarter wave plate 73 and the polarizer 74 are placed between the color wheels 71, 72. Further the color wheels 71, 72 are turned to each other so that two different dichroic segments are at one time in the illumination part. Always one segment of each color wheel 71, 72 covers the illumination or optical path.

If white linear polarized light ($\lambda 1$) is coming from a lamp and is hitting the first segment as shown in FIG. 8A of the first color wheel light L11 of spectral part $\lambda 2$ will be reflected and light L12 of spectral part $\lambda 3 + \lambda 4$ is transmitted. The polarizer 74 and the quarter wave plate 73 also transmit this part. At the quarter wave plate 73 the light is turned in to circular polarized light. At the second color wheel 72 spectral part $\lambda 3$ or L1' is reflected and spectral part $\lambda 4$ is transmitted in the direction of PBS part 52. Here the light L12 is reflected by part 52 and illuminates part 62.

The reflected part $\lambda 3$ changes its circular polarization during reflection at the segment surface. The quarter wave plate 73 will turn the circular polarization back in to linear polarization which is now at 90° turned when compared to light $\lambda 1$. Now the polarizer 74 absorbs the reflected spectral part $\lambda 3$.

By turning both color wheels 71, 72, alternatively spectral part $\lambda 2$, $\lambda 3$, or $\lambda 4$ are either transmitted, absorbed or reflected. This is done in order to generate primary colors for the displays.

REFERENCE SYMBOLS

10 Inventive projector arrangement
11 First inventive image generation and projection unit 12 Second inventive image generation and projection unit
20 Illumination unit
21 Lamp unit, lamp device
21 Lamp
21r Reflector
22 Illumination optics
22l Projection lens
22m Deviation mirror
41 Projection optics
42 Projection optics
50 Display unit, screen
51 Beam splitting section, polarization selective beam splitting device or cube
52 Beam splitting section, polarization selective beam splitting device or cube
61 Display section, imager panel, LCD
62 Display section, imager panel, LCD
70 Color switching unit, reflective electronic color switch, RECS
71 Color wheel
72 Color wheel
73 Quarter wave plate
74 Polarizer
80 Interface section
90-1 Half wave retarder
90-2 Half wave retarder
100 Conventional projector arrangement
111 First conventional image generation and projection unit
112 Second conventional image generation and projection unit
130 Control unit
DI Display image
I1 First image
I2 Second Image
L1 Primary illumination light
L1' Waste light
L11 Component of primary illumination light
L12 Component of primary illumination light
L21 Secondary illumination light, image light
L22 Secondary illumination light, image light
L31 Tertiary illumination light, projection light
L32 Tertiary illumination light, projection light

The invention claimed is:

1. A projector arrangement, comprising:
a first image generation and projection unit configured to generate a first image and to project or display the first image in a two-dimensional manner for a displaying image;
a second image generation and projection unit configured to generate a second image and to project or display the second image in a two-dimensional manner for a display image;
wherein the first and second image generation and projection units are configured to realize in cooperation a first or two-dimensional projection/display mode in which the display image is projected and/or displayed in a strict two-dimensional manner,
wherein the first and second image generation and projection units are configured to realize in cooperation a second stereoscopic or three-dimensional projection/display mode in which the display image is projected and/or displayed in a stereoscopic or three-dimensional manner,
wherein the first and second image generation and projection means are formed as modules detachably attachable with respect to each other, and
wherein the second image generation and projection unit is configured to receive waste light from the first image generation and projection unit and to base the generation of the second image on the waste light or a part or derivative of the waste light.

2. A projector arrangement according to claim 1, wherein the first image generation and projection unit is configured to be operated or to be operable as a stand-alone device independent from the second generation and projection unit in the first or two-dimensional projection/display mode.

3. A projector arrangement according to claim 1, wherein the first image generation and projection unit is configured to receive and/or to generate primary illumination light.

4. A projector arrangement according to claim 1, wherein the first image generation and projection unit comprises an illumination unit.

5. A projector arrangement according to claim 3, wherein the first image generation and projection unit is configured to use a part or component of the primary illumination light for generating the first image.

6. A projector arrangement according to claim 5, wherein the first image generation and projection unit is configured to provide and/or to supply a part or component of the primary illumination light which is not used for generating the first image as the waste light.

7. A projector arrangement according to claim 1, wherein the first image generation and projection unit and/or the second image generation and projection unit comprise an image generation unit for generating the respective first and second images, a beam splitting unit, and/or a projection unit for projecting the first image and the second image, respectively.

8. A projector arrangement according to claim 1, wherein the first image generation and projection unit comprises a color-switching unit for time-sequential color selection.

9. A projector arrangement according to claim 8, wherein said color-switching unit is configured to receive light, to reflect a first part of the received light, the first part being within a first spectral range, and to transmit a second part of the received light, the second part being within a second spectral range.

10. A projector arrangement according to claim 8, wherein the color-switching unit is configured to be placed in a symmetrical manner in an illumination path, and/or to work in a reflective mode for the first image generation and projecting unit and to work in a transmittive mode for the second image generation and projection unit.

11. A projector arrangement according to claim 1, wherein the first image generation and projection unit comprises an interface section by which the waste light can be supplied from the first image generation and projection unit to the second image generation and projection unit.

12. A projector arrangement according to claim 11, wherein the interface section is based at least in part on the color switch unit.

13. A projector arrangement, comprising:
a first image generation and projection unit configured to generate a first image using primary illumination light and to project or display the first image in a two-dimensional manner for a displaying image;
a second image generation and projection unit configured to generate a second image using components of the primary illumination light that have not been used for generating the first image and to project or display the second image in a two-dimensional manner for a display image;

wherein the first and second image generation and projection units are configured to realize in cooperation a first or two-dimensional projection/display mode in which the display image is projected and/or displayed in a strict two-dimensional manner, wherein the first and second image generation and projection units are configured to realize in cooperation a second stereoscopic or three-dimensional projection/display mode in which the display image is projected and/or displayed in a stereoscopic or three-dimensional manner, wherein the first and second image generation and projection means are formed as modules detachably attachable with respect to each other.

14. A projector arrangement according to claim 13, wherein the first image generation and projection unit comprises an illumination unit.

15. A projector arrangement according to claim 13, wherein the first image generation and projection unit is configured to use a part or component of the primary illumination light for generating the first image.

16. A projector arrangement according to claim 1, wherein the first image generation and projection unit comprises a color-switching unit for time-sequential color selection, said color-switching unit being configured to receive the primary light, to reflect a first part of the received primary light towards the first or the second image generation and projection unit, the first part being within a first spectral range, and to transmit a second part of the received primary light towards the other one of the first and the second image generation and projection unit, the second part being within a second spectral range.

17. A projector arrangement according to claim 16, wherein the color-switching unit is configured to be placed in a symmetrical manner with respect to the first and second image generation and projection unit in an illumination path.

18. A projector arrangement according to claim 1, wherein the first image generation and projection unit comprises an interface section that is configured to supply the components of the primary illumination light that have not been used for generating the first image from the first image generation and projection unit to the second image generation and projection unit.

* * * * *